Figure 1:
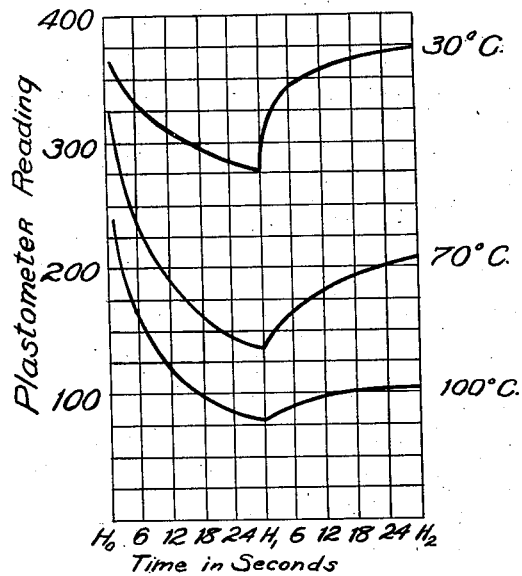

Patented Apr. 9, 1940

2,196,714

UNITED STATES PATENT OFFICE 2,196,714

RUBBERLIKE POLYMER AND METHOD OF MAKING THE SAME

Victor E. Wellman, Silver Lake, Ohio, assignor to The B. F. Goodrich Company, New York, N. Y., a corporation of New York Application October 1, 1937, Serial No. 166,826

8 Claims. (Cl. 260—63)

This invention relates to the polymerization of unsaturated ketones and to the plastic products obtained thereby.

It is well known that unsaturated ketones can be polymerized to form hard, glassy compositions. Though the compositions are useful for some purposes, they in no way resemble rubber, and they are entirely unsuited for use as a rubber substitute. It is the object of this invention, therefore, to provide plastics which exhibit properties strikingly similar to those of rubber and which exhibit additional desirable properties not possessed by natural rubber.

The compounds within the scope of this invention have the structural formula

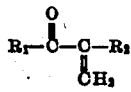

wherein $R_1$ is a hydrocarbon group and $R_2$ is hydrogen or an alkyl group. Typical compounds which may be polymerized to give the products of this invention include methyl vinyl ketone, ethyl vinyl ketone, isopropyl vinyl ketone, cyclohexyl vinyl ketone, phenyl vinyl ketone, alpha-naphthyl vinyl ketone, para-tolyl vinyl ketone, para-xenyl vinyl ketone, benzyl vinyl ketone, methyl isopropenyl ketone, methyl 1-butenyl ketone, methyl isobutenyl ketone, etc. Since methyl vinyl ketone is apparently of the greatest interest commercially, it will be referred to in the specific examples. It is to be understood, however, that any of the other compounds mentioned above may be readily used in performing the method of this invention.

I have discovered that by interrupting the polymerization before it has reached completion, I am able to form a product which greatly resembles crude rubber instead of the hard, glassy product ordinarily formed by the polymerization.

The unsaturated ketones of my invention may be satisfactorily polymerized by means of light, particularly actinic radiation, or heat, or a combination of the two. A sample of methyl vinyl ketone was placed six inches from a day-light bulb for twenty four hours. At the end of this time, the product was examined and found to be a solid jell. Without further treatment, the polymerization proceeded to form the glassy product. If the polymerization was stopped at this point, however, there remained a rubbery product which was entirely different from the polymers previously known.

Polymerization by heat is usually performed in a closed vessel to allow heating at temperatures greater than the boiling point of the unsaturated ketone, although polymers have been formed by heating in an open flask. Methyl vinyl ketone, for instance, may be heated in a closed vessel at 150° C. for about four hours to form a thin jell. The rubbery polymer is obtained by removing the monomer. The heat-polymers are in general softer than the light-polymers, and when used alone are less satisfactory rubber substitutes than the stiffer light-polymers. They are extremely useful, however, because they may be combined with the harder light-polymers as plasticizing agents, thereby forming rubbery compositions.

There are many methods of interrupting the polymerization. One of the simplest methods comprises removing the monomer by any convenient method such as by steam distilling the product or by heating it in a vacuum oven.

The polymerization may also be interrupted by adding an inhibitor of polymerization before or after the removal of the monomer. Suitable inhibitors include hydroquinone, meta-dinitrobenzene, cupric oxide, cuprous halides, and nitrogenous bases such as diphenylamine, pyridine, phenyl-beta-naphthylamine, and urea. The inhibitors are preferably added in solution to facilitate even distribution through the jell which is formed, acetone solutions being generally satisfactory.

Another method of interrupting the polymerization before the glassy polymer is formed comprises polymerizing in solution. Methyl vinyl ketone was dissolved in an equal volume of water and exposed to sunlight. Within one minute the solution became cloudy, the rubbery polymer which was formed being insoluble in water. Within ten minutes, a nearly quantitative yield of the rubbery polymer had precipitated from the water solution. An inhibitor was added to prevent further polymerization, and the polymer was dried to form a material similar to the polymers previously formed.

Polymerization may also be carried out in alcohol, the product being obtained by a rather unusual method. Methyl vinyl ketone was dissolved in an equal volume of ethyl alcohol, and the solution was exposed to sunlight until a thick syrup was formed. The rubbery polymer was precipitated by merely adding more alcohol to the solution. This same method may be employed using other alkyl alcohols, similar results being obtained.

I have found that the polymerization of unsaturated ketones proceeds much faster in the absence of oxygen. Methyl vinyl ketone was exposed to sunlight in the presence of air, oxygen, and carbon dioxide respectively. After forty minutes, no polymerization had occurred in the presence of air and oxygen, but the polymerization was complete in the presence of carbon dioxide. Further experiments showed that the polymerization proceeded more rapidly in the presence of hydrogen, nitrogen, water, and other non-oxygenous media than in the presence of air or oxygen. All of the oxygen does not have to be excluded to obtain a desirable effect. For commercial purposes, substantial elimination of oxygen is all that is necessary.

By polymerizing the unsaturated ketones of this invention in the presence of certain catalysts, the formation of the glassy polymer is prevented and a rubbery product is obtained. Any compound of silver, copper, or mercury may be used as a catalyst, though the halides and oxides of any of the above metals have given the best results.

10 gms. of mercuric chloride were dissolved in 50 c. c. of acetone. 1 c. c. of this solution was added to 10 c. c. of methyl vinyl ketone. After 3 days, the mixture started to thicken. After 6 days, the monomer was removed from the polymer by distillation under reduced pressure, and a pale yellow, elastic material greatly resembling rubber was obtained as a residue.

Polymerization under the influence of the catalysts of this invention does not proceed as rapidly as polymerization in the absence of catalyst, but the rubbery polymers formed in the presence of catalyst possess properties entirely different from those of the hard, glassy polymers usually formed. 15 c. c. of methyl vinyl ketone, and 15 c. c. of methyl vinyl ketone to which was added 1.5 c. c. of the solution of mercuric chloride in acetone, were exposed to ultra violet light for six hours. Both samples were then moved to ordinary light. After 1½ days, the pure methyl vinyl ketone had formed a tight gel, while the catalyzed sample was a heavy syrup. After 2½ days, the pure polymer was hard and glassy. The catalyzed sample, however, was a soft gel which was transformed into the rubbery polymer previously obtained by removing the monomer.

As another specific embodiment of my invention, I will describe in detail the preparation of the rubbery polymer of methyl vinyl ketone in the absence of a catalyst. I exposed a sample of methyl vinyl ketone to a daylight bulb for twenty four hours. In the stiff jell which was formed I incorporated one percent by weight of phenyl-beta-naphthylamine in acetone solution. I then heated the product in a vacuum oven at about 125° C. for about 45 minutes to remove the monomer. The polymers made by this process are colorless or light yellow non-thermoplastic solids greatly resembling pale crude rubber in appearance.

The marked similarity of rubber and the products of my invention is shown in the comparison of their plasticities in the accompanying drawing, of which—

Figure 2:
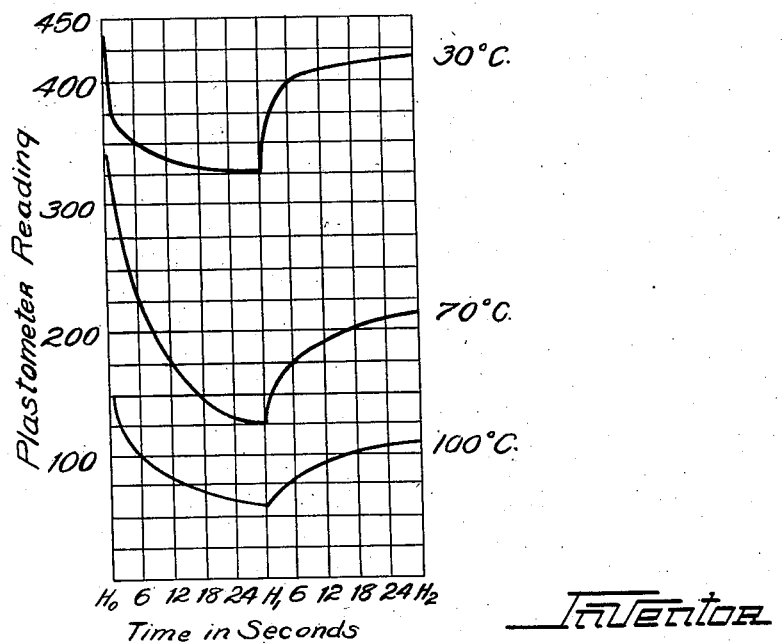

Fig. 1 shows the plasticity of rubber, and
Fig. 2 shows the plasticity of a polymer at three temperatures.

The light-polymer of methyl vinyl ketone prepared above and fine para crude rubber were masticated for 15 minutes and allowed to reset for 24 hours. Plasticities at 30° C., 70° C. and 100° C. were then determined on a standard Dietrich-Karrer plastometer. In the graphs, the abscissae represent time in seconds, and the ordinates represent readings on the plastometer scale, the higher numbers representing greater heights of the cylindrical samples of material being tested. As can be seen, the plunger was applied to the samples at $H_0$, and remained for 30 seconds, being released at $H_1$. The height at the end of another 30 seconds is represented at $H_2$. It can be readily seen from the graphs that rubber and polymerized methyl vinyl ketone have very similar plasticities over a wide temperature range.

Although the polymers resemble rubber in some respects, they are greatly superior to rubber in their resistance to many solvents, being entirely unaffected by aromatic and aliphatic hydrocarbons, gasoline, lubricating oil, grease, and other materials which are very deleterious to rubber. Since they are unaffected by water, even when immersed therein for long periods at elevated temperatures, the polymers of this invention are excellent materials for use on submarine cables. Its resistance to alkali makes polymerized methyl vinyl ketone an excellent material for tank linings, pipe linings, stoppers, etc. which may come in contact with alkaline materials.

The polymers of this invention may be processed by using rubber technique. They may be mixed with softeners, fillers, and pigments and the compounded or uncompounded materials may be milled, calendered, extruded or spread. Solutions of polymers in chloroform or ethyl acetate may be used to impregnate fabrics, to deposit protective films, as adhesives, and for many other uses which will be apparent.

While I have herein disclosed with considerable particularity certain preferred manners of performing my invention, I do not desire or intend to limit myself solely thereto, for many modifications such as the use of other materials having equivalent properties are within the spirit and scope of the invention as defined in the appended claims.

I claim:

1. The method of making a rubbery polymer of an unsaturated ketone having the structural formula

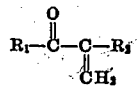

where $R_1$ is a hydrocarbon group and $R_2$ is a member of the class consisting of hydrogen and alkyl groups which comprises polymerizing said ketones to the rubbery state in the presence of a catalyst of the class consisting of compounds of mercury, copper and silver, and interrupting the polymerization before the glass-like polymer is formed.

2. The method of making a rubbery polymer of methyl vinyl ketone which comprises polymerizing said ketone to the rubbery stage in the presence of mercuric chloride, and interrupting the polymerization before the glass-like polymer is formed.

3. The method of making a rubbery polymer of methyl vinyl ketone which comprises polymerizing said ketone to the rubbery stage, and interrupting the polymerization by adding an inhibitor before the glass-like polymer is formed.

4. The method of making a rubbery polymer of methyl vinyl ketone which comprises polymerizing said ketone to the rubbery stage, and interrupting the polymerization by adding an inhibitor and removing the monomer before the glass-like polymer is formed.

5. The method of making a rubbery polymer of methyl vinyl ketone which comprises polymerizing said ketone to the rubbery stage in an atmosphere of carbon dioxide in the presence of mercuric chloride, and interrupting the polymerization before the glass-like polymer is formed.

6. A rubbery polymer prepared by the method of claim 2.

7. A rubbery polymer prepared by the method of claim 1.

8. A rubbery polymer prepared by the method of claim 3.

VICTOR E. WELLMAN.